United States Patent [19]

Girard

[11] Patent Number: 5,513,068
[45] Date of Patent: Apr. 30, 1996

[54] COMPUTER CASE WITH ADJUSTABLE DRIVE HOUSING FOR INTERCHANGEABLE DESKTOP/TOWER CONFIGURATION AND CONTROL PANEL ATTACHABLE TO THE DRIVE HOUSING

[75] Inventor: Joseph G. M. P. Girard, Richmond, Canada

[73] Assignee: Seanix Technology Inc., British Colombia, Canada

[21] Appl. No.: 250,066

[22] Filed: May 27, 1994

[30] Foreign Application Priority Data

Jun. 1, 1993 [CA] Canada ................................ 2097476

[51] Int. Cl.⁶ ................................ G06F 1/16; H05K 7/14
[52] U.S. Cl. ................................ 361/685; 361/683
[58] Field of Search ................ 364/708.1; 312/223.2, 312/109, 257.1, 263, 265.5, 265.6; 361/679–687, 724–727

[56] References Cited

U.S. PATENT DOCUMENTS

| | | | |
|---|---|---|---|
| 5,121,296 | 6/1992 | Hsu | 361/685 |
| 5,124,885 | 6/1992 | Liu | 361/683 |
| 5,159,528 | 10/1992 | Murphy | 361/683 |
| 5,209,356 | 5/1993 | Chaffee | 361/724 X |
| 5,235,493 | 8/1993 | Yu | 361/685 |
| 5,248,193 | 9/1993 | Schlemmer | 312/223.2 |

Primary Examiner—Michael W. Phillips
Attorney, Agent, or Firm—Oyen Wiggs Green & Mutala

[57] ABSTRACT

A personal computer case having a rectangular front panel with a pair of long sides and a pair of short sides. A drive housing can be attached to the case in either a desktop position in which drives mounted in the housing extend parallel to the front panel's long sides; or, in a tower position in which drives mounted in the housing extend parallel to the front panel's short sides. A separate control panel can be attached to the drive housing, parallel to the drives. The drive housing has a square cross-section sized to receive the control panel and a plurality of industry standard width drives stacked atop one another. Preferably, the cross-section is sized to receive the control panel and up to three industry standard 5¼" wide drives stacked atop one another. The front panel has an aperture with the same cross-section as the drive housing. The drive housing is positioned behind the aperture so that drives mounted in the housing remain accessible through the aperture. A plurality of cover plates are provided to cover portions of the drive housing in which no drive is mounted. The cover plates can be mounted in the front panel aperture in a desktop position in which the cover plates extend parallel to the front panel's long sides; or, in a tower position in which the cover plates extend parallel to the front panel's short sides.

6 Claims, 6 Drawing Sheets

COMPUTER CASE WITH ADJUSTABLE DRIVE HOUSING FOR INTERCHANGEABLE DESKTOP/TOWER CONFIGURATION AND CONTROL PANEL ATTACHABLE TO THE DRIVE HOUSING

FIELD OF THE INVENTION

This application pertains to a personal computer case having a drive housing which can be installed in either of two positions so that drives mounted in the housing remain horizontal whether the case is used in a tower or in a desktop configuration.

BACKGROUND OF THE INVENTION

A typical personal computer ("PC") has a case containing various circuit boards; a power supply; a cooling fan; connectors for coupling to peripheral devices such as monitors, keyboards, printers, etc.; and, one or more mounting brackets or housings into which a variety of storage devices can be inserted. The storage devices (commonly called "drives") typically comprise floppy disk drives, hard disk drives, tape drives, CD-ROM drives and the like. The PC user places the case in one of two different orientations known as the "desktop" and "tower" orientations. In the "desktop" orientation the larger planar surfaces of the case lie horizontally; in the "tower" orientation they stand vertically. The PC user decides which orientation to use based on factors such as available space, location of and access to peripheral devices, and personal preference.

In prior art PC cases the drive housings can be mounted in the case in only one way, thus fixing the orientation of the drives relative to the case, irrespective of whether the user places the case in the desktop or tower orientation. Originally, only desktop cases were available. In a desktop case the drive housings are fixed to the case so that drives mounted in the housings extend parallel to the cases's larger planar surfaces, which in turn lie parallel to the supporting surface on which the user rests the case in the desktop orientation. As indicated above, the user may decide to stand a desktop case on one of its narrower ends in the "tower" orientation, in which event the drives extend vertically relative to the surface on which the case rests. In many situations this will not cause problems. However, some drives operate satisfactorily only when they are substantially horizontal. To address this problem PC manufacturers developed a special "tower" case in which the drive housings are fixed to the case at 90° relative to the positioning of the drive housings in a desktop case. When placed in the vertical "tower" orientation, the tower case maintains the drives horizontal relative to the support surface on which the case rests.

Although the desktop and tower case styles solve the drive orientation problem, they present problems for PC manufacturers who must incur the added cost of stocking two different case styles and supplying them to suit different customers' needs. The present invention overcomes this problem by providing a single case which can be used in either the desktop or tower orientation while maintaining the drives horizontally to the support surface on which the case rests in either orientation.

SUMMARY OF THE INVENTION

In accordance with the preferred embodiment, the invention provides a personal computer case having a rectangular front panel with a pair of long sides and a pair of short sides. A drive housing can be attached to the case in either a desktop position in which drives mounted in the housing extend parallel to the front panel's long sides; or, in a tower position in which drives mounted in the housing extend parallel to the front panel's short sides.

A separate control panel can be attached to the drive housing, parallel to the drives. The drive housing has a square cross-section sized to receive the control panel and a plurality of industry standard width drives stacked atop one another. Preferably, the cross-section is sized to receive the control panel and up to three industry standard 5¼" wide drives stacked atop one another.

The front panel has an aperture with the same cross-section as the drive housing. The drive housing is positioned behind the aperture so that drives mounted in the housing remain accessible through the aperture. A plurality of cover plates are provided to cover portions of the drive housing in which no drive is mounted. The cover plates can be mounted in the front panel aperture in a desktop position in which the cover plates extend parallel to the front panel's long sides; or, in a tower position in which the cover plates extend parallel to the front panel's short sides.

DETAILED DESCRIPTION OF THE PREFERRED EMBODIMENT

Figure 1:
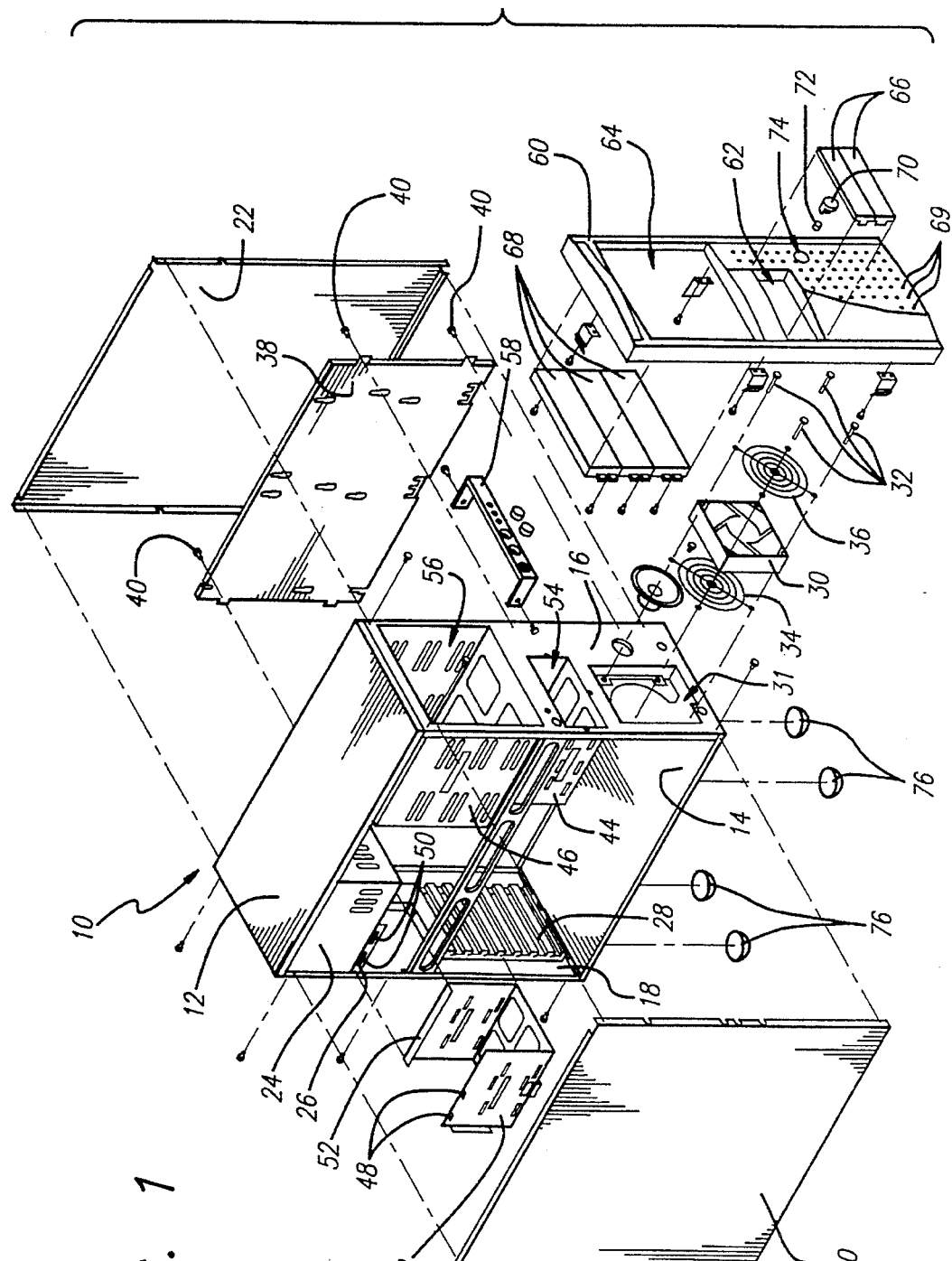
FIG. 1 is an exploded pictorial illustration of a PC case constructed in accordance with the preferred embodiment of the invention.

As shown in FIG. 1, the invention comprises a case generally designated 10 having upper and lower plates 12, 14; front and rear plates 16, 18 and left and right side plates 20, 22. These plates are fastened to one another with the aid of screws (not shown) to form a rectangular enclosure.

Within case 10 a power supply 24 is mounted on support bracket 26 which is in turn fastened to rear plate 18. A slotted panel 28 is fixed in rear plate 18 beneath power supply 24. Fan 30 is mounted over aperture 31 in front plate 16 with the aid of screws 32 to draw cooling air through case 10 via slotted panel 28. Finger guards 34, 36 are mounted on either side of fan 30 to prevent operator injury by the rotating fan blades.

Three drive housings 42, 44, 46 are provided. Drive housing 42 is for removably receiving one or two industry standard 3½" wide hard disk drives (not shown); housing 44 is for removably receiving one or two industry standard 3½" wide drives (not shown); and; drive housing 46 is for removably receiving up to three industry standard 5¼41 wide drives (not shown). A motherboard support bracket is held by screws 40 within the right side of case 10.

Drive housing 42 is detachably mounted on support bracket 26 beneath power supply 24 and above slotted panel 28. Tabs 48 on housing 42 engage mating protrusions 50 in bracket 26. Tab 52 on housing 42 is slidably received within a mating slot (not shown) in bracket 26. In operation, the hard disk drives mounted in housing 42 do not need to be physically accessible to the PC user, so they can be enclosed within case 10. Moreover, such drives need not lie substantially horizontal for satisfactory operation. Accordingly, it is not necessary to adjust the orientation of housing 42 depending upon whether case 10 is to be placed in the desktop or tower orientation.

Drive housings 44, 46 are for removably receiving drives which must remain accessible to the PC user, such as floppy disk drives, tape drives and CD-ROM drives. All such drives have frontal apertures into which the user inserts floppy diskettes, tape cartridges or CD-ROM disks. These apertures must be accessible through case 10. Accordingly, drive housings 44, 46 are screw mounted on front plate 16 over apertures 54, 56 in plate 16. Drives mounted in either of housings 44, 46 thus remain accessible through apertures 54, 56 respectively.

Industry standard 3½" drives of the type which can be mounted in housing 44 need not lie substantially horizontal for satisfactory operation. Accordingly, it is not necessary to adjust the orientation of housing 44 depending upon whether case 10 is to be placed in the desktop or tower orientation. However, some industry standard 5¼" drives of the type which can be mounted in housing 46 should preferably lie substantially horizontal for satisfactory operation. Accordingly, it is desirable to adjust the orientation of housing 46, depending upon whether case 10 is to be placed in the desktop or tower orientation, to maintain such drives horizontal. Further details of the manner in which drive housing 46 is adjustably positioned in case 10 are provided below.

A control panel 58 is screw mounted on drive housing 46. Control panel 58 has apertures through which buttons and lights protrude. The buttons enable the PC user to activate the PC circuitry's "reset" or "turbo" functions. The lights allow the user to monitor the status of hard drives mounted in drive housing 42, etc.

A plastic cover panel 60 is snap-fitted over front plate 16. Apertures 62, 64 in panel 60 overlap apertures 54, 56 in front plate 16, providing access to drives mounted in housings 44, 46. Two cover plates 66 are snap-fitted in the upper and lower halves of aperture 62 to temporarily cover the upper and lower frontal portions of drive housing 44 if no drive is mounted in either of those portions. Similarly, three cover plates 68 are screw mounted to the rear of front panel 60 to temporarily cover portions of aperture 64 corresponding to portions of drive housing 46 in which no drive is mounted. A plurality of small apertures 69 in front panel 60 allow fan 30 to exhaust air from within case 10.

Power button 70 and spring 72 are mounted in aperture 74 of front panel 60. Button 70 is coupled to power supply 24 to enable the PC user to turn the PC's power on or off. Rubber feet 76 are mounted on the outer face of bottom plate 14 to cushion case 10 against its support surface when case 10 is in the tower configuration depicted in FIG. 1. If case 10 is in the desktop configuration described below then rubber feet 76 are mounted on the outer face of right side plate 22.

Figure 2A:
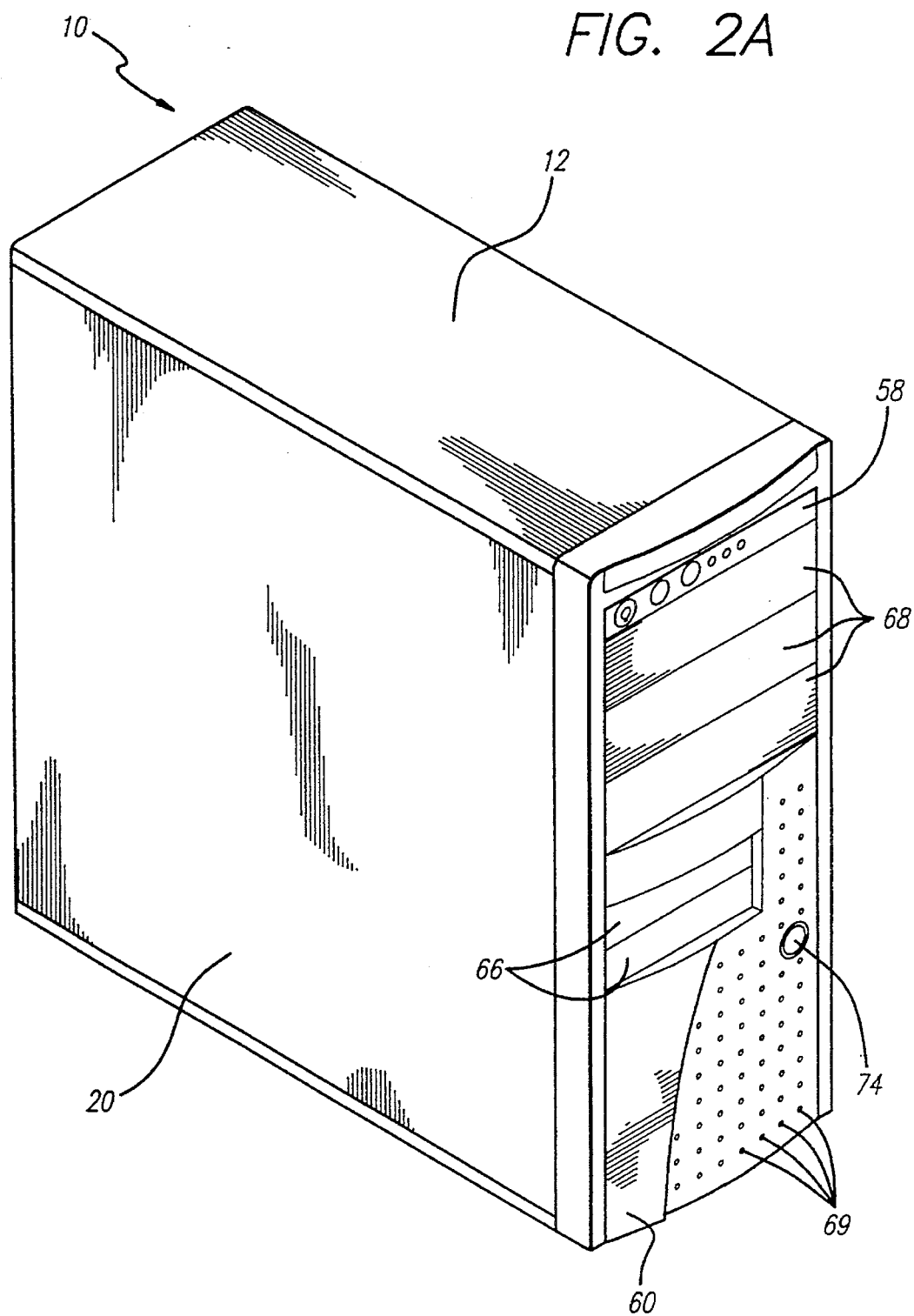
FIG. 2A is a pictorial illustration of the FIG. 1 case in the tower configuration.
Figure 2B:
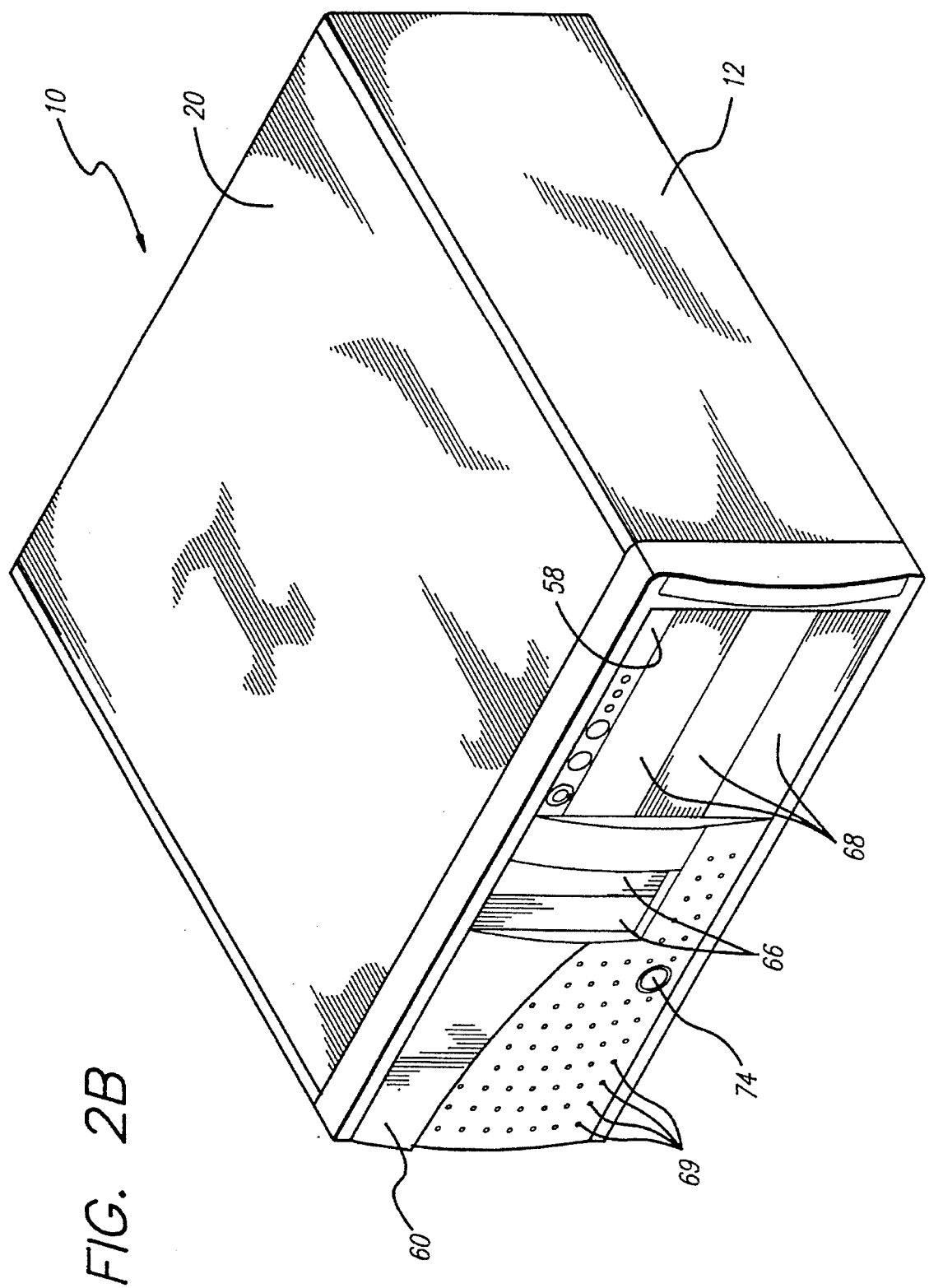
FIG. 2B is a pictorial illustration of the FIG. 1 case in the desktop configuration.

Drive housing 46 and control panel 58 can be adjustably mounted in case 10 in either one of two orientations. FIG. 2A shows case 10 in its tower configuration, with left and right side plates 20, 22 extending vertically relative to the support surface on which case 10 rests and with upper and lower plates 12, 14 parallel to the support surface. FIG. 2B shows case 10 in its desktop configuration, with left and right side plates 20, 22 parallel to the support surface on which case 10 rests and with upper and lower plates 12, 14 extending vertically relative to the support surface. Note that, in either configuration, control panel 58 and cover plates 68 are parallel to the support surface. It will thus be understood that if any of cover plates 68 are removed to expose a portion of drive housing 46 through apertures 56, 64 then a drive mounted behind the exposed portion will lie parallel to the support surface. That is, housing 46 can be adjusted, as described below, to maintain the drives horizontal, irrespective of whether case 10 is placed in the tower or desktop orientation.

Figure 2C:
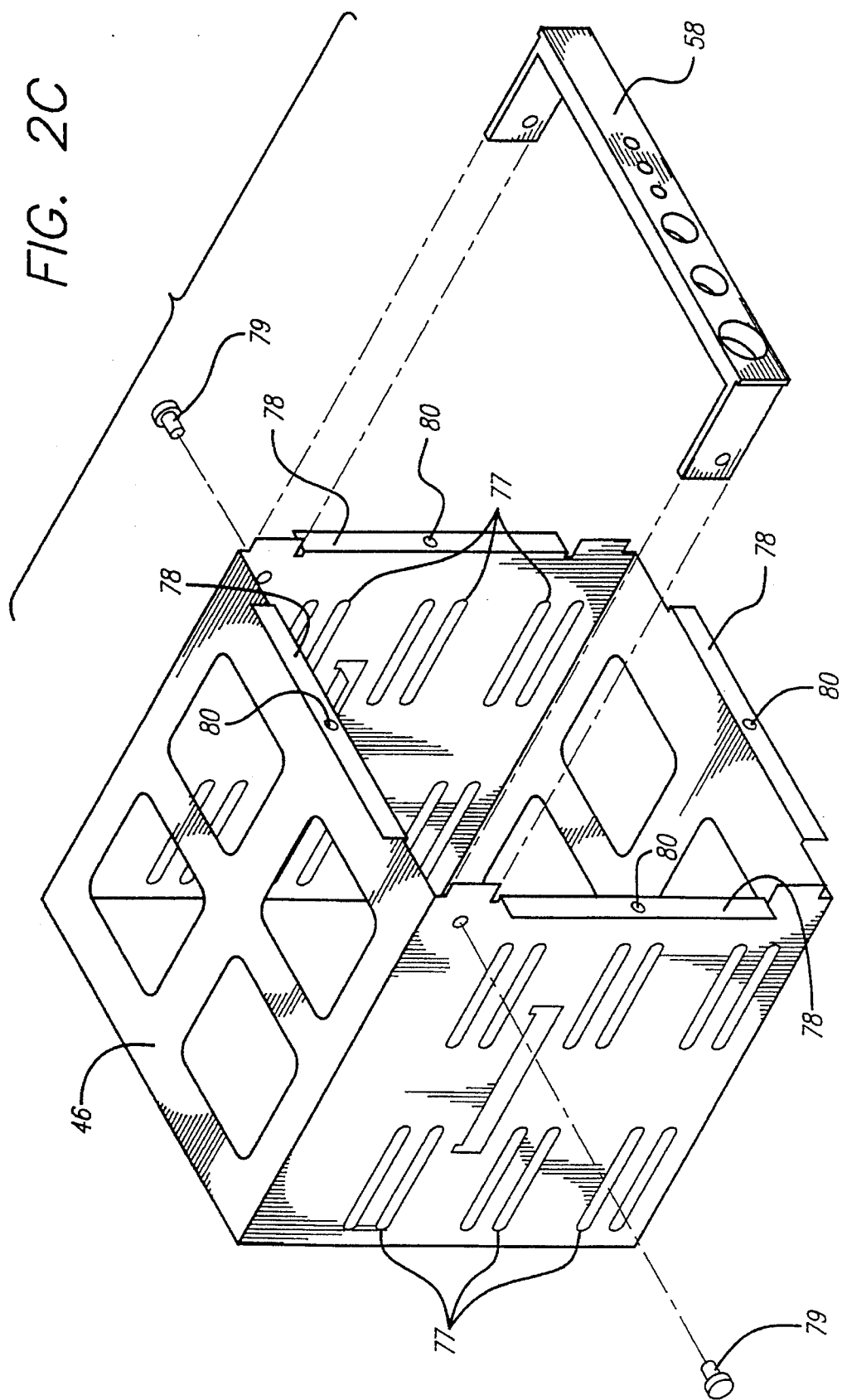
FIG. 2C is a pictorial illustration of the adjustable drive housing and control panel of the preferred embodiment.
Figure 5:
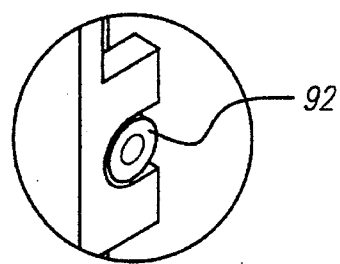
FIGS. 5 and 6 are enlarged illustrations of portions of the rear surface of the case's front panel, showing how temporary drive slot cover plates are mounted in the tower and desktop configurations.

FIG. 2C shows drive housing 46 and control panel 58 in greater detail. Housing 46 is fabricated to define an aperture having a square cross-section sized to receive control panel 58 and up to three industry standard 5¼" wide drives stacked atop one another. The drives are mounted in housing 46 by sliding their side rails into one of three opposed pairs of mating channels 77 provided in the sides of housing 46. Control panel 58 is fixed to housing 46 by screws 79. Four outwardly projecting tabs 78 are provided on the front of drive housing 46. Each of tabs 78 has an aperture 80 for receiving a screw (not shown) for fastening housing 46 to the rear face of front plate 16.

Figure 3:
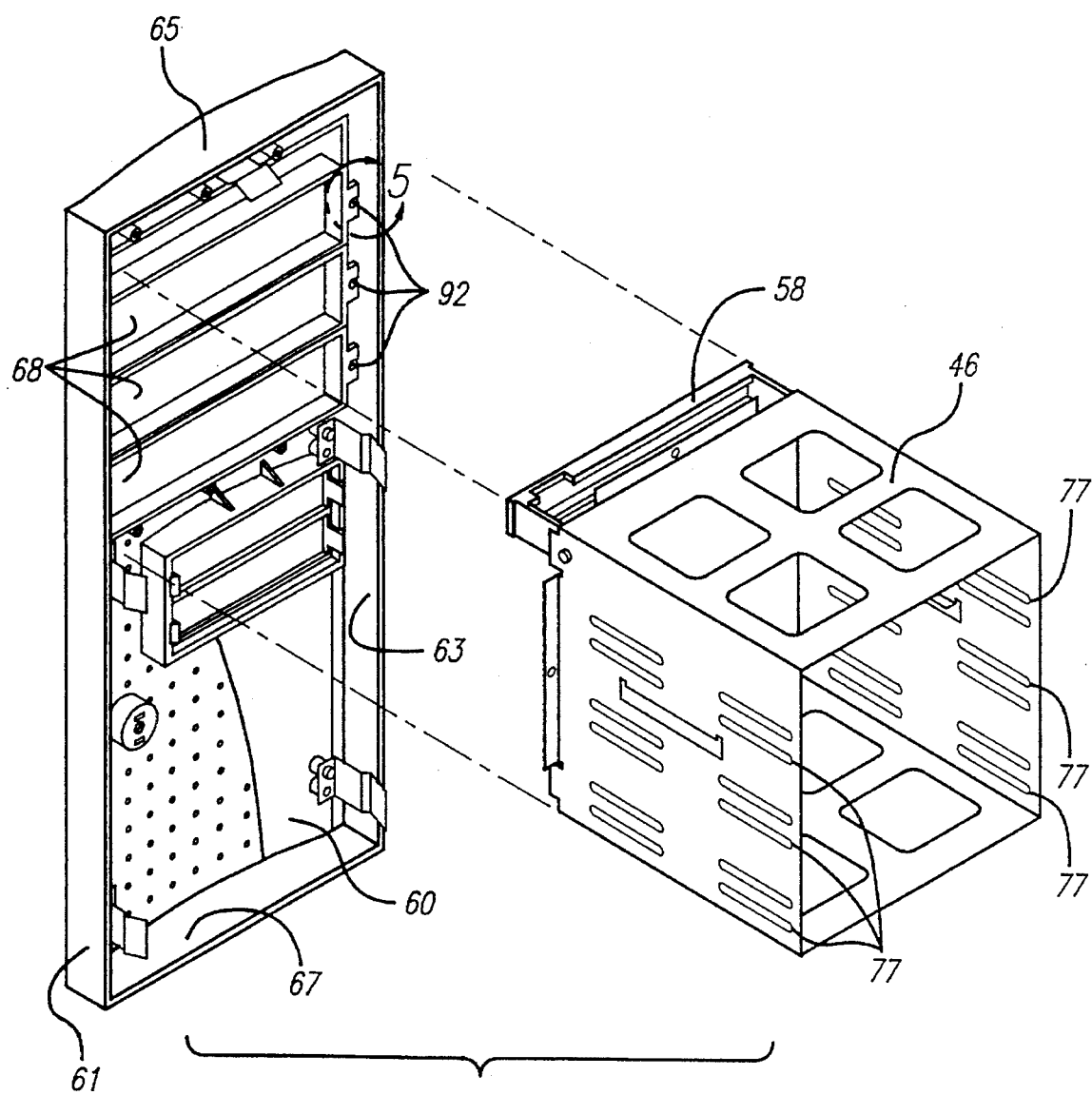
FIG. 3 is a rear pictorial illustration of the case's front panel, showing how the adjustable drive housing, control panel, and drive cover plates are positioned to give the case a tower configuration.

FIG. 3 shows further details of the tower configuration mounting of drive housing 46 and control panel 58 relative to front panel 60. In this configuration, housing 46 is attached to front plate 16 with the sides of housing 46 containing channels 77 parallel to the long sides 61, 63 of panel 60. Accordingly, when a drive is inserted into one of the three pairs of channels 77, the drive extends parallel to the short sides 65, 67 of front panel 60. More particularly, the drive extends horizontally relative to the support surface on which case 10 rests in the tower orientation. Similarly, control panel 58 extends horizontally relative to the support surface on which case 10 rests in the tower orientation.

Figures 4, 6:
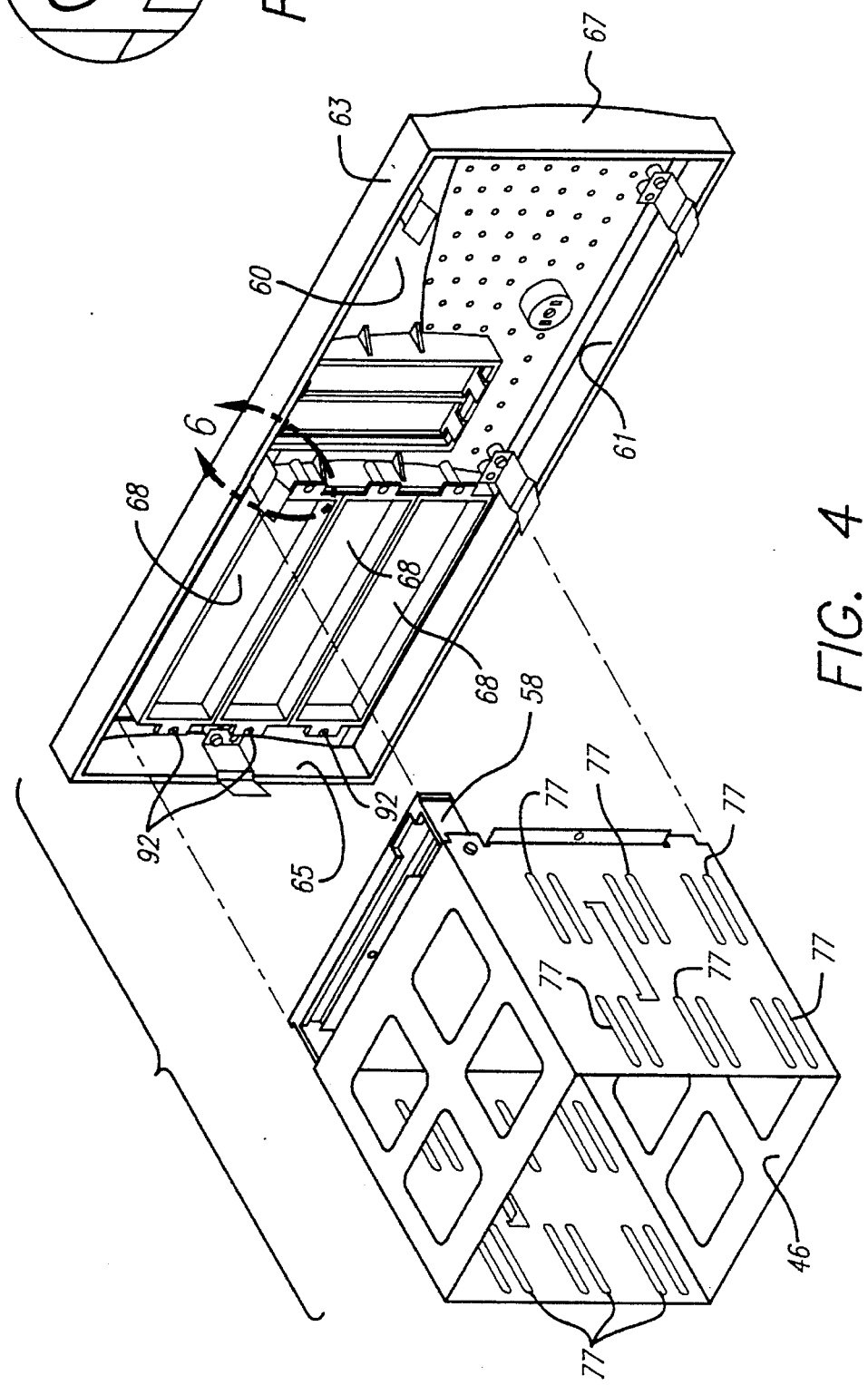
FIG. 4 is a rear pictorial illustration of the case's front panel, showing how the adjustable drive housing, control panel, and drive cover plates are positioned to give the case a desktop configuration.

FIG. 4 shows further details of the desktop configuration mounting of drive housing 46 and control panel 58 relative to front panel 60. In this configuration, housing 46 is attached to front plate 16 with the sides of housing 46 containing channels 77 parallel to the short sides 65, 67 of panel 60. Accordingly, when a drive is inserted into one of the three pairs of channels 77, the drive extends parallel to the long sides 61, 63 of front panel 60. More particularly, the drive extends horizontally relative to the support surface on which case 10 rests in the desktop orientation. Similarly, control panel 58 extends horizontally relative to the support surface on which case 10 rests in the desktop orientation.

FIGS. 3, 4, 5 and 6 also show screw apertures 92 along the left, right, top and bottom inner sides of front panel aperture 64. Apertures 92 facilitate horizontal mounting of cover plates 68 within aperture 56 when case 10 is in either the tower or desktop configurations.

In operation, case 10 is easily configured for tower or desktop orientation by adjusting the position of housing 46, as follows. Front panel 60 is removed by pulling it away from front plate 16. Cover plates 68 are removed from front panel 60 and reattached thereto using pairs of apertures 92 transverse to those formerly used to attach cover plates 68 to front panel 60. Left side plate 20 and upper plate 12 are removed by releasing their fastening screws. The screws which fasten tabs 78 of drive housing 46 to front plate 16 are removed, freeing housing 46 from case 10. Housing 10 is rotated 90° relative to its former position in case 10 and the screws are replaced to reattach tabs 78 to front plate 16. Left side plate 20 and upper plate 12 are replaced. Front panel 60 is snapped back in place over front plate 16.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A personal computer case comprising:
   (a) a rectangular front panel having a pair of long sides and a pair of short sides;
   (b) a drive housing attachable to said case in:
      (i) a desktop position in which drives mounted in said housing extend parallel to said long sides; or in,
      (ii) a tower position in which drives mounted in said housing extend parallel to said short sides; and,
   (c) a control panel attachable to said drive housing, parallel to said drives.

2. A personal computer case as defined in claim 1, wherein said drive housing is square in cross-section.

3. A personal computer case as defined in claim 2, wherein said cross-section is sized to receive said control panel and a plurality of industry standard width drives stacked atop one another.

4. A personal computer case as defined in claim 2, wherein said cross-section is sized to receive said control panel and up to three industry standard 5¼" wide drives stacked atop one another.

5. A personal computer case as defined in claim 2, further comprising an aperture in said front panel having said cross-section.

6. A personal computer case as defined in claim 5, further comprising:
   (a) a plurality of cover plates; and,
   (b) mounting means for removably mounting said cover plates in said front panel aperture in:
      (i) a desktop position in which said cover plates extend parallel to said long sides; or in,
      (ii) a tower position in which said cover plates extend parallel to said short sides.

* * * * *